Oct. 13, 1953
P. E. SEIFRIED
2,655,046
GYROSCOPE INSTRUMENT
Filed Feb. 29, 1952
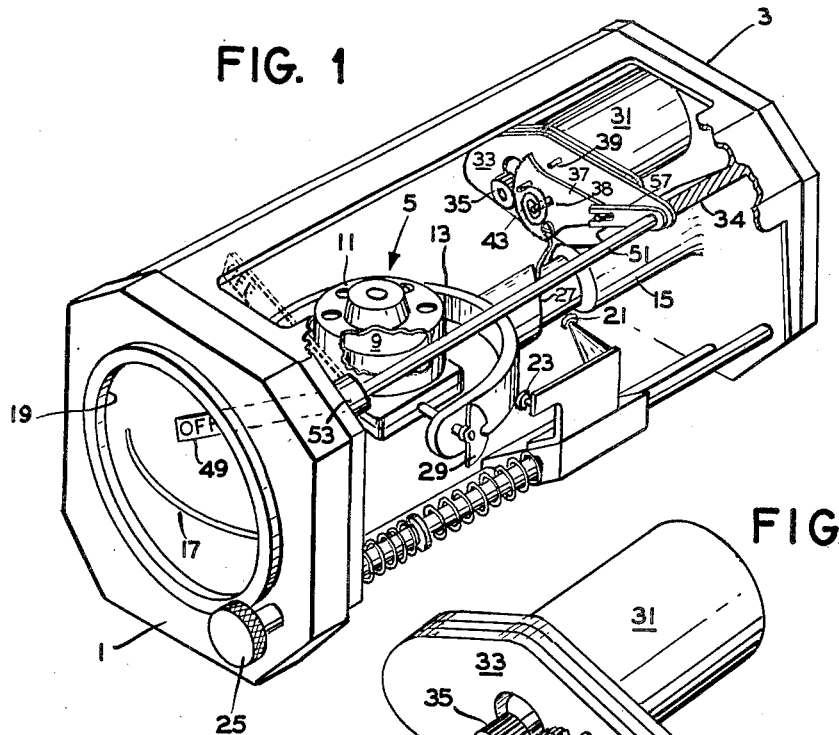
INVENTOR.
PAUL E. SEIFRIED
BY
*[signature]*
ATTORNEY Patented Oct. 13, 1953

2,655,046

UNITED STATES PATENT OFFICE 2,655,046

GYROSCOPE INSTRUMENT

Paul E. Seifried, New City, N. Y., assignor to Bendix Aviation Corporation, Teterboro, N. J., a corporation of Delaware Application February 29, 1952, Serial No. 274,129

10 Claims. (Cl. 74—5.2)

1

The invention relates generally to instruments of the kind used on aircraft and more particularly to indicating instruments using a gyroscope.

The invention is embodied in a vertical gyroscope indicator and in its broader aspects the invention may be incorporated in any type gyroscope which may be damaged by centrifugal and vibrational forces induced by high speed rotation of the unbalanced outer gimbal after the rotor support has rolled over following deenergization of the gyroscope.

The main object of the present invention is to prevent rotation of the unbalanced outer gimbal of the gyroscope when the gyroscope is deenergized either as a result of an accidental break in the electrical circuit or by intentional operation of a switch.

Another object is to provide a power failure indicator which is actuated when the gyroscope is deenergized either accidentally or intentionally.

The invention contemplates a gyroscope having a rotor driven by an electric motor and adapted to spin in a support about an axis having a predetermined attitude. The support is mounted in a gimbal for angular movement about mutually perpendicular axes at an angle to the spin axis. A brake element restrains angular movement of the support about one of the mutually perpendicular axes. A two-phase torque motor is connected in series with the motor driving the rotor and upon energization moves the brake element to provide for angular movement of the rotor support about the mutually perpendicular axes. Whenever the gyroscope motor is deenergized either accidentally or intentionally, the torque motor is deenergized also and the brake is moved by suitable means into a position to restrain angular movement of the rotor about the one axis to prevent damage to the instrument in which the gyroscope is used. A power failure indicator may be provided to indicate a power-off condition when the rotor motor is deenergized, and the indicator may be operated by the torque motor when energized to indicate a power-on condition.

The foregoing and other objects and advantages of the invention will appear more fully hereinafter from a consideration of the detailed description which follows, taken together with the accompanying drawing wherein two embodiments of the invention are illustrated by way of example. It is to be expressly understood, however, that the drawing is for the purpose of illustration and description only, and is not intended as a definition of the limits of the invention.

2

In the drawing,

Figure 1 is a perspective view of a horizon indicator having a gyroscope constructed according to the invention and having a two-phase torque motor for operating a brake and a power failure indicator;

Figure 2 is a detailed perspective view of a portion of Figure 1 drawn to enlarged scale;

Figure 3 is a schematic wiring diagram showing electrical connections of the two-phase torque motor and a three-phase rotor driving motor; and Figure 4 is a schematic wiring diagram showing the electrical connections of the two-phase torque motor when used with a two-phase rotor driving motor.

Referring now to the drawing for a more detailed description of the novel braking means of the present invention, the braking means is shown in Figure 1 as incorporated in a gyro horizon indicator having a housing with a front wall 1 and a rear wall 3. A gyro vertical 5 is mounted within the housing and has a three-phase motor 7 (Fig. 3) for driving a rotor 9 within a casing or support 11. The casing is mounted for angular movement in a gimbal 13 rotatably supported by a bearing 15 integral with rear wall 3. A horizon indicator bar 17 is visible through a window 19 in wall 1 and is controlled by the gyro vertical and indicates the attitude of the craft in which the gyro horizon indicator is mounted.

Any suitable mechanism may be used for caging the gyroscope, but preferably is of the kind described in Konet et al. application Serial Number 134,038, filed December 20, 1949, and assigned to the same assignee as the present application, wherein cam followers 21, 23 actuated by a knob 25 on front wall 1 engage cams 27, 29 fixed to gimbal 13 and casing 11, respectively. Any suitable erecting means (not shown) may be used for maintaining the spin axis of the gyroscope vertical.

A two-phase motor 31 is secured by a bracket 33 to a rib 34 extending forwardly of rear wall 3. The motor is drivably connected by a gear 35 on the motor shaft to a sector gear 37 mounted on a pivot 38 fixed to bracket 33 for limited angular movement between a pair of stops 39, 41. Motor 31, when energized, pivots sector gear 37 into engagement with stop 41 whereupon the motor stalls. A spiral spring 43 having one end secured to pivot 38 on bracket 33 and its other end fixed to a pin 45 on sector gear 37 yieldingly urges the sector gear into engagement with stop 39 when motor 31 is deenergized.

A brake element 47 is fixed to sector gear 37.

When torque motor 31 is deenergized and the sector gear is moved by spring 43 into engagement with stop 39, the brake element engages cam 27 as gimbal 13 rotates approximately 45° to either side of center position and restrains further rotation of the gimbal. When torque motor 31 is energized, sector gear 37 is driven into engagement with stop 41 by the torque motor and brake element 47 releases the gimbal for normal operation.

Even when the rotor motor is deenergized, if the craft is banked less than 45°, the gyroscope operates normally while the rotor has sufficient speed due to its momentum to maintain the spin axis vertical. This is especially desirable if power failure is only momentary. If the brake engaged the cam immediately upon power failure, then the gyroscope would precess from the vertical and be unreliable during the momentary power failure.

The device may be provided with a power failure indicator of the kind shown in co-pending application Serial Number 177,996, filed August 7, 1950, by Henry Konet and Paul E. Seifried, and assigned to the same assignee as the present application. The indicator 49 is mounted on one end of an elongated shaft 51 rotatably supported by bearings 53, 54 in front wall 1 and in bracket 33, respectively. A slotted lever 57 is mounted on the other end of shaft 51 and engages a pin 59 on sector gear 37. When torque motor 31 is deenergized, the indicator is moved by spring 43 to a position in which the indicator is visible through window 19, as shown in solid lines in Figure 1, and when the torque motor is energized, the indicator is moved by motor 31 to a position in which the indicator is hidden from view behind the front wall, as shown in dotted lines in Figure 1.

Referring to Figure 3, the three-phase gyroscope motor 7 has its windings 61, 63, 65 connected to a three-phase power source 67. Windings 69, 71 of torque motor 31 are connected to the power source in series with windings 61, 63 of gyroscope motor 7. When the gyroscope motor is energized for normal operation, current flows through windings 69, 71 of the torque motor and the torque motor drives sector gear 37 into engagement with stop 41 so that brake element 47 releases gimbal 13 and indicator 49 is moved behind wall 1 from the view of the observer and thereby indicates to the observer that the rotor motor is energized for normal operation.

When no current flows through any one of the windings 61, 63 or 65 of gyroscope motor 7, at least one winding 69, 71 of torque motor 31 is deenergized and the motor exerts no torque on sector gear 37. Spring 43 urges sector gear 37 into engagement with stop 39 so that brake element 47 restrains angular movement of gimbal 13 and indicator 49 is visible to the observer through window 19 and thereby indicates to the observer that the rotor motor is de-energized.

In Figure 4 a two-phase gyroscope motor 7a has its phase windings 73, 75 connected to a two-phase power source 77. Windings 69a, 71a of torque motor 31a are connected to the power source in series with windings 73, 75 of motor 7a. When motor 7a is energized, current flows through windings 69a, 71a of the torque motor which causes the motor to move the brake element into gimbal releasing position and to move the indicator behind front wall 1. When no current flows through either winding of motor 7a, at least one winding of torque motor 31a is deenergized and the motor exerts no torque on sector gear 37. Spring 43 moves the brake element into position to restrain angular movement of the gimbal, and the indicator is moved to a position where it is visible through window 19.

With the arrangements described, if any one portion of the circuit is open inside or outside of the instrument so that current cannot flow through that portion, the torque motor will be deenergized and the brake will restrain angular movement of the gimbal and the indicator will indicate a power-off condition. If a dead short occurs in the gyroscope motor, the torque motor will be connected directly across the power source and will burn out and the brake element will restrain movement of the gimbal and the indicator will indicate a power-off condition. Also, should the voltage of the power source be below normal and insufficient to energize the torque motor, or if the phase rotation of the current source be reversed relative to the instrument so that the gyroscope rotor rotates in a reverse direction, the brake element will restrain movement of the gimbal and the indicator will indicate a power-off condition.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A gyroscope having a rotor adapted to spin about one axis, a support for said rotor mounted for angular movement about mutually perpendicular axes at an angle to said spin axis, a motor having polyphase windings for spinning said rotor, a brake element restraining angular movement of said support about one of said mutually perpendicular axes when said motor is deenergized, and a two-phase torque motor having its phase windings connected in series with two of the phase windings of said rotor motor and, when energized, operating said brake element to release said support.

2. A gyroscope having a rotor adapted to spin about one axis, a support for said rotor mounted for angular movement about mutually perpendicular axes at an angle to said spin axis, a motor having polyphase windings for spinning said rotor, a brake element for restraining angular movement of said support about one of said mutually perpendicular axes, yielding means for operating said brake element to restrain angular movement of said support about said one axis, and a two-phase torque motor having its phase windings connected in series with two of the phase windings of said rotor motor, and, when energized, operating said brake element to release said support.

3. A gyroscope having a rotor adapted to spin about one axis, a support for said rotor, a motor for spinning said rotor, a gimbal mounting said support for angular movement about mutually perpendicular axes at an angle to the spin axis, a caging cam rigid with said gimbal, a brake element arranged to engage said cam to restrain angular movement of said support about one of said mutually perpendicular axes when said motor is deenergized, and a torque motor connected in series with said rotor motor and, when energized, operating said brake element to release said support.

4. A gyroscope having a rotor adapted to spin about one axis, a support for said rotor, a motor for spinning said rotor, a gimbal mounting said support for angular movement about mutually perpendicular axes at an angle to the spin axis, a caging cam rigid with said gimbal, a brake element arranged to engage said cam to restrain further angular movement of said gimbal when said motor is deenergized and said gimbal rotates a predetermined angle to either side of center position, and a torque motor connected in series with said rotor motor and, when energized, operating said brake element to release said gimbal.

5. A gyroscope having a rotor adapted to spin about one axis, a support for said rotor, a gimbal mounting said support for angular movement about mutually perpendicular axes at an angle to said spin axis, a caging cam rigid with said gimbal, an electric motor having polyphase windings for spinning said rotor, a two-phase torque motor having its phase windings connected in series with two of the phase windings of said rotor motor, a brake element movable into a position for engaging said cam and restraining angular movement of said gimbal, a sector gear rotatable between limits for operating said brake element, said sector gear being driven to brake-releasing position by said torque motor when said torque motor is energized, and yielding means for moving said sector gear to brake-restraining position upon deenergization of at least one winding of said torque motor.

6. A gyroscope having a rotor adapted to spin about one axis, a support for said rotor mounted for angular movement about mutually perpendicular axes at an angle to said spin axis, an electric motor having polyphase windings for spinning said rotor, a two-phase torque motor having its phase windings connected in series with two of the phase windings of said rotor motor, a sector gear rotatable between limits and driven in one direction by said torque motor when said torque motor is energized, a brake element for restraining angular movement of said support about one of said mutually perpendicular axes and operated by said sector gear upon energization of said two-phase torque motor to release said support to provide for its angular movement about said axis, and yielding means for operating said brake element upon deenergization of said motors to restrain angular movement of said support about said one axis.

7. A gyroscope having a rotor adapted to spin about one axis, a support for said rotor mounted for angular movement about mutually perpendicular axes at an angle to said spin axis, a three-phase electric motor for spinning said rotor, a brake element limiting angular movement of said support about one of said mutually perpendicular axes when said motor is deenergized, and a two-phase torque motor connected in series with two of the phase windings of said rotor motor and, when energized, operating said brake element to release said support.

8. A gyroscope having a rotor adapted to spin about one axis, a support for said rotor mounted for angular movement about mutually perpendicular axes at an angle to said spin axis, a two-phase electric motor for spinning said rotor, a brake element limiting angular movement of said support about one of said mutually perpendicular axes when said motor is deenergized, and a two-phase torque motor having its phase windings connected in series with the phase windings of said rotor motor and, when energized, operating said brake element to release said support.

9. A gyroscope having a rotor adapted to spin about one axis, a support for said rotor mounted for angular movement about mutually perpendicular axes at an angle to said spin axis, an electric motor for spinning said rotor, a brake element restraining angular movement of said support about one of said mutually perpendicular axes when said motor is deenergized, an indicator indicating deenergization of said motor when said motor is deenergized, and a two-phase torque motor connected in series with said rotor motor and, when energized, operating said brake element to release said support and operating said indicator to indicate energization of said motor.

10. A gyroscope having a rotor adapted to spin about one axis, a support for said rotor mounted for angular movement about mutually perpendicular axes at an angle to said spin axis, an electric motor for spinning said rotor, a brake element for restraining angular movement of said support about one of said mutually perpendicular axes, an indicator for indicating deenergization of said motor, yielding means for operating said indicator, when said motor is deenergized, to indicate deenergization of said motor and for operating said brake element to restrain angular movement of said support about said one axis, and two-phase motor means connected in series with said rotor motor and, when energized, operating said indicator to indicate energization of said driving motor and operating said brake element to release said support.

PAUL E. SEIFRIED.

References Cited in the file of this patent

UNITED STATES PATENTS

| Number | Name | Date |
|---|---|---|
| 2,283,720 | Brandt | May 19, 1942 |
| 2,419,928 | Wiggin et al. | Apr. 29, 1947 |
| 2,588,607 | Barkalow | Mar. 11, 1952 |